United States Patent [19]

Karlyn

[11] Patent Number: 4,936,946

[45] Date of Patent: Jun. 26, 1990

[54] APPARATUS FOR APPLYING LABELS TO CURVED OBJECTS

[75] Inventor: David A. Karlyn, West Hartford, Conn.

[73] Assignee: Electrocal Inc., South Windsor, Conn.

[21] Appl. No.: 904,877

[22] Filed: Sep. 8, 1986

[51] Int. Cl.[5] .................. B32B 35/00

[52] U.S. Cl. .................. 156/486; 156/238; 156/540; 156/541

[58] Field of Search .................. 156/230, 238, 240, 239, 156/249, 289, 361, 218, 213, 481, 486, 488, 493, 490, 539, 540, 541, 241

[56] References Cited

U.S. PATENT DOCUMENTS

| | | | |
|---|---|---|---|
| 3,434,902 | 3/1969 | Bliss | 156/249 |
| 3,657,054 | 4/1972 | Warsager | 156/238 |
| 3,816,207 | 6/1974 | Robertson et al. | 156/238 |
| 3,943,023 | 3/1976 | Weingrad | 156/540 |
| 4,539,063 | 9/1985 | Cué et al. | 156/238 |

*Primary Examiner*—Michael W. Ball
*Assistant Examiner*—L. Falasco
*Attorney, Agent, or Firm*—McCormick, Paulding & Huber

[57] ABSTRACT

A labeling apparatus applies transfer labels to the curved peripheral surface of articles, such as bottles and other containers. An article support positions the article at a label transfer station within the apparatus with the curved peripheral surface of the article exposed and the article freely rotatable about its longitudinal axis. A labeling carriage, mounted for reciprocating movement back and forth relative to the transfer station, moves a web of transfer labels relative to the supported article, such that the label web and the curved surface of the article are in tangential rolling contact. A heating plate, mounted on the carriage adjacent that portion of the web in contact with the article, releases one label from the web for transfer onto the curved surface of the article.

7 Claims, 2 Drawing Sheets

APPARATUS FOR APPLYING LABELS TO CURVED OBJECTS

BACKGROUND OF THE INVENTION

This invention relates generally to a method and apparatus for applying labels to articles, such as bottles and other containers. In particular, the invention is a method and apparatus for applying a transfer label from a series of labels on a web to the curved peripheral surface of an article.

In general, the prior art teaches two broad categories of labeling systems. In the first category are those machines which employ a silk screening process. Typically, these machines utilize a rubber squeegee for wiping ink through a silk screen which bears a label design. The screen is mounted on a movable labeling carriage which is reciprocated by the action of, for example, a double-acting pneumatic motor. Silk screening machines of this type also provide an article support for positioning the article at a labeling station within the machine. The article support must be capable of moving the peripheral surface of the article into and out of pressure engagement with the screen in a plane orthogonal to the plane of motion of the reciprocating labeling carriage. The article support must also allow the article to rotate freely about its longitudinal axis, in order to maintain engagement of the article's curved surface with the screen, as the screen is translated past the labeling station. To perform a labeling operation, the squeegee and article are maintained in alignment and in compression with one another as the screen is translated in the plane of its surface between these two elements. A machine of this type is described in U.S. Pat. No. 3,249,043.

In the second category of labeling systems are those machines which utilize heat transfer labels. Typically, these machines utilize a heating plate for pressure engagement with the upper surface of a web carrying a series of heat transfer labels. The heating plate is secured to the main frame of the machine, and the web travels along a path extending from a supply roll to a take-up roll, both of whih rolls are also fixed to the main frame of the machine. The article to be labeled is supported on a movable article support which carries a first drive for rotating the article about its longitudinal axis, a second drive for moving the article support in a direction orthogonal to the plane defined by the heating plate's bottom surface, and a third drive for moving the article support in a direction parallel to the plane defined by the heating plate bottom surface. To accomplish a labeling operation, the curved peripheral surface of the article is brought into pressure engagement with the lower surface of the web using the lower surface of the heating plate as a bearing surface. With the web interposed between the article surface and the heating plate in this manner, the article support is translated in a direction parallel to the heating plate's bottom surface. As the rotating bottle is moved along the lower surface of the stationary web, the heating plate causes a transfer label to be released from the web and bond to the article surface. A machine of this type is described in U.S. Pat. No. 4,502,380.

Machines utilizing heat transfer labels have enjoyed widespread commercial success over the last ten to fifteen years, since they are able to transfer a label comprising a number of colors in pre-established and observable relationship with one another to an article surface in a one-step operation. Conversely, silk screening machines can apply only one color at a time to an article surface. Therefore, where the label contains more than one color, a multi-step operation is necessitated, which requires a number of different silk screens corresponding to the number of different colors contained on the label. Moreover, any error in registration or marring of the label is not detectable until after the label has been applied to the article.

Accordingly, a principal object of the present invention is to provide a method and apparatus for applying heat transfer labels without the disadvantages of the silk screening processes of the prior art. In particular, it is an object of the present invention to provide a labeling apparatus which can be constructed by a simple conversion of the prior art silk screening device.

SUMMARY OF THE INVENTION

The present invention resides in a method and apparatus for transferring labels from a label web to the curved peripheral surface of an article, such as a bottle.

The apparatus is designed with an article support for positioning the article at a label transer station with the curved peripheral surface of the article exposed, and the label is applied as the label web in pressure engagement with release means is translated in tangential rolling contact with the article surface. A labeling carriage mounted for reciprocating movement back and forth in one direction relative to the transfer station bears feeding means for the web of transfer labels. The feeding means defines a feed path along which the web of transfer labels extends between supply and take-up points at opposite ends of the path.

First drive means reciprocates the labeling carriage relative to the label transfer station with a portion of the web of transfer labels in tangential rolling contact with the curved peripheral surface of the article to transfer the labels onto the article. Second drive means moves the web of transfer labels and the surface of the article out of contact with each other after the label has been applied, and third drive means mounted on the labeling carriage indexes the web of transfer labels in the series along the feed path by a predetermined amount for positioning another transfer label adjacent to the release means.

The apparatus offers the advantages of the prior art transfer labeling machines which apply preformed labels to a curved article surface without the difficulties associated with the silk screening process. At the same time, the apparatus has the additional feature of being easily constructed by conversion of the prior art silk screening machines described above.

BRIEF DESCRIPTION OF THE DRAWINGS

The invention will be more fully understood, and still further objects and advantages will become apparent, in the following detailed description of the preferred embodiment of the invention illustrated in the accompanying drawings, in which.

DESCRIPTION OF THE PREFERRED EMBODIMENT

Figure 1:
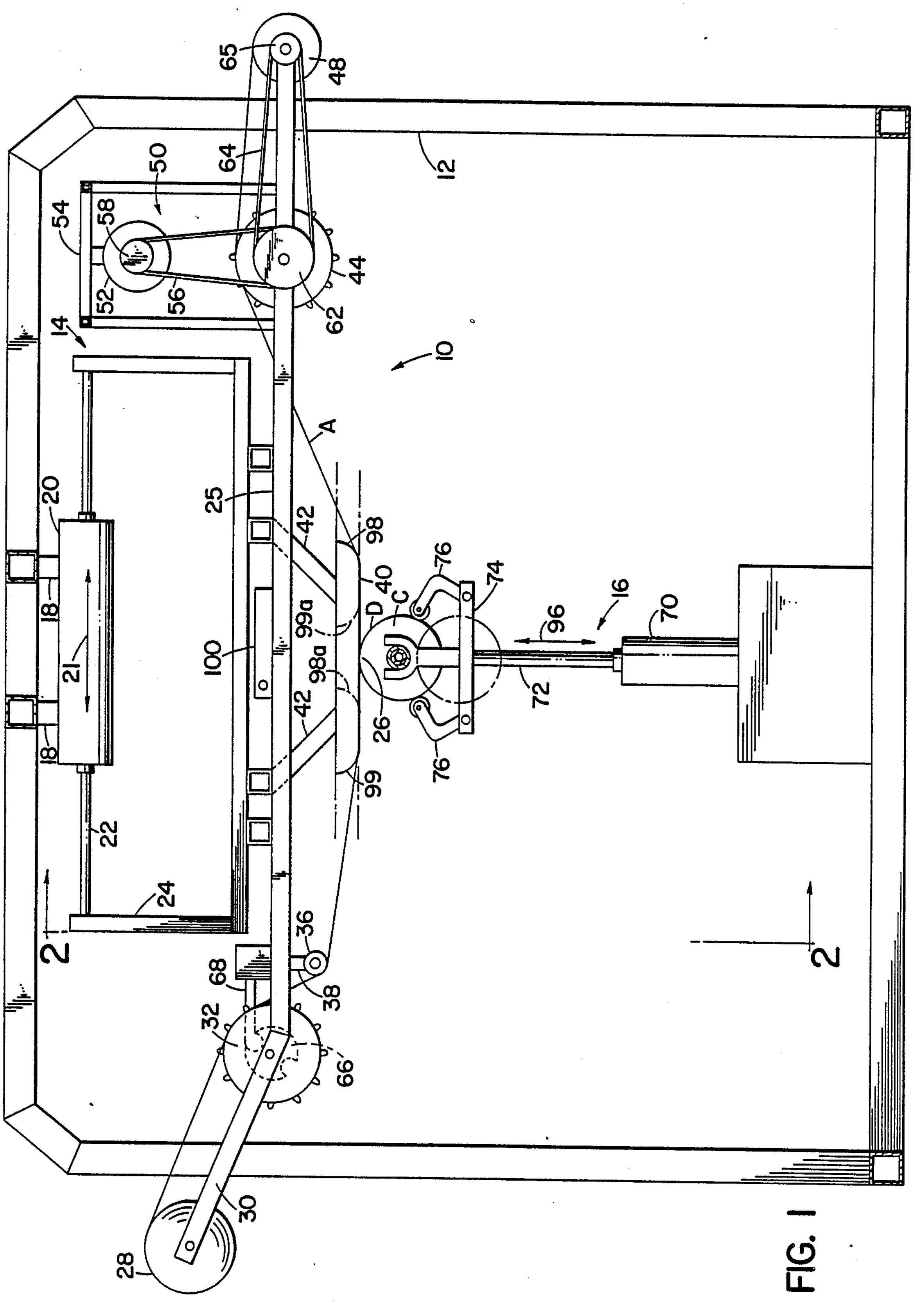
FIG. 1 is a front elevation of an apparatus constructed in accordance with the invention.
Figure 2:
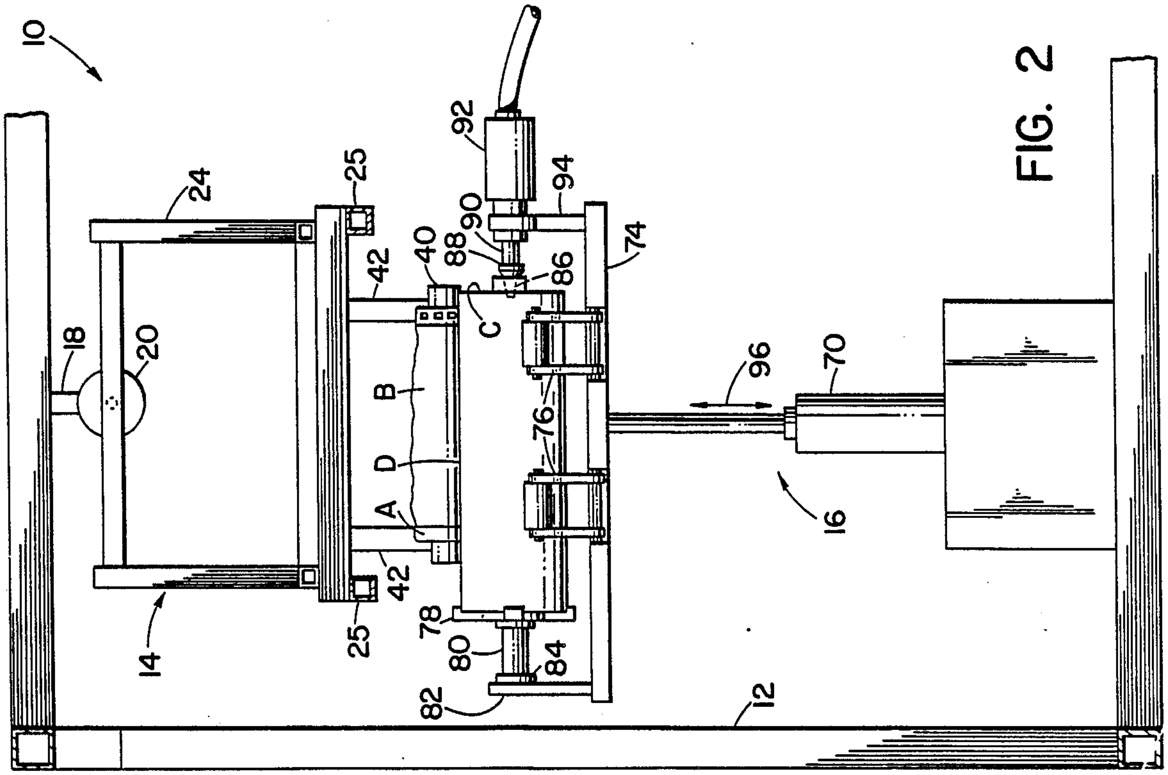
FIG. 2 is a partially sectioned side elevation of the labeling carriage and bottle support.

Referring now to FIGS. 1 and 2, the label applying apparatus, generally designated 10, comprises a mainframe 12 carrying a reciprocating labeling carriage, generally designated 14, and an article support mechanism, generally designated 16. The labeling carriage 14 is mounted for horizontal movement relative to mainframe 12 by means of structural supports 18,18, and a piston cylinder assembly 20. The piston and cylinder assembly 20 includes piston rod 22, the opposite ends of which are connected to the labeling carriage upper frame 24, and serves as a double-acting pneumatic motor to reciprocate the labeling carriage 14 back and forth relative to label transfer station 26 in the direction indicated by arrow 21.

The labeling carriage 14 carries a number of support rollers which define a feed path along which a web A of heat releasable transfer labels B (shown in FIGS. 2 and 3) extends between supply and take-up points at opposite ends of the path. The label web A passes from supply roll 28, which is mounted on the lower frame 25 of the labeling carriage 14 by roll support 30, to a measuring roller 32, which measures the web as the web advances along the feed path. The measuring roller 32 is rotatably mounted to the lower frame 25 of the labeling carriage 14 by a shaft 34 (shown in FIG. 4), and the roller has sprockets which mesh with perforations in the margin of label web A (shown in FIGS. 2, 3, and 4). The label web A passes from the measuring roller 32 under a guide roller 36, which is mounted to the labeling carriage 14 by roller support 38 and extends under the lower surface of a heating plate 40, which is mounted to the lower frame 25 of the labeling carriage by supports 42,42. During a labeling operation, which will be described in detail below, the heating plate 40 causes a transfer label B to be released from label web A and to bond to the curved surface D of the article or bottle C to be labeled.

The label web A continues from the lower surface of heating plate 40 to a drive roller 44 which is mounted to the labeling carriage 14 by a shaft 46 (shown in FIG. 3) and has sprockets which mesh with the perforations in the margin of label web A. From drive roller 44, the label web A passes finally to take-up roll 48, which is mounted to labeling carriage 14 at the projecting end of the lower frame 25.

Figure 3:
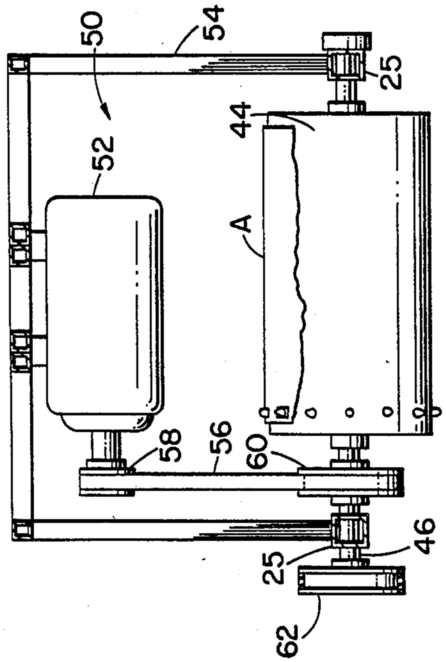
FIG. 3 is a fragmentary side elevation of the drive mechanism for indexing the web of heat transfer labels along the feed path.
Figure 4:
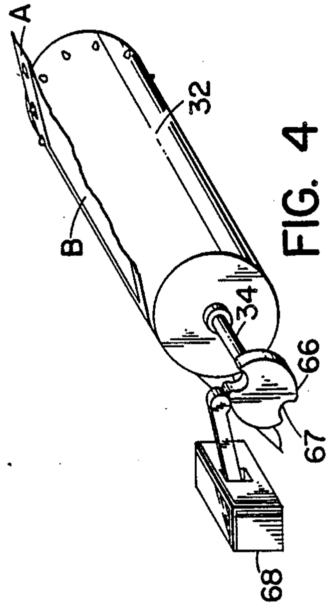
FIG. 4 is a fragmentary perspective view of the cam detent and detent pickup used in conjunction with the drive mechanism for indexing the web.

The label web A is advanced along the feed path by a drive mechanism generally designated 50. Referring now to FIGS. 1 and 3, drive mechanism 50 comprises drive motor 52, which is mounted to the lower frame 25 of the labeling carriage 14 by drive mechanism support frame 54. The motor 52 rotates drive roller 44 by means of a drive chain 56 between a sprocket 58, which is mounted on the drive shaft of motor 52, and a sprocket 60, which is mounted on the drive shaft 46 (shown in FIG. 3) of drive roller 44. A pulley 62, also mounted on the drive shaft 46, is linked to the take-up roll 48 by belt 64 and pulley 65; thus, as drive motor 52 rotates drive roller 44 to advance label web A, the take-up roll 48 is also rotated to take up the spent web. To accommodate changes in the diameter of the web material wound on the take-up roll, the belt 64 may an O-ring or other material which fits loosely and is allowed to slip on the pulleys 62 and 65.

After each labeling operation, drive mechanism 50 indexes label web A so that a fresh label is brought to a release position beneath heating plate 40. For this purpose, drive motor 52 is electronically linked to cam detent 66 (shown best in FIG. 4) mounted on the shaft 34 coaxially with measuring roller 32 for synchronous rotation with the roller. The angular distance between the detent depressions 67 on the surface of cam detent 66 corresponds to an angular distance along the circumference of measuring roller 32, which in turn corresponds to the linear distance label web A must be indexed to properly position a fresh label beneath heating plate 40. The cam detent 66 is mounted on the end of the shaft 34 to permit the detent to be easily changed with the label spacing on each new label web A.

Cam detent 66 is linked to detent pickup 68 (shown best in FIG. 4) for detecting the indexing movement of the web A by the drive motor 52. As long as the arm of detent pickup 68 rides along the raised surface of cam detent 66, drive motor 52, once activated, remains engaged. When the arm of detent pickup 68 falls into detent depression 67, detent pickup 68 signals drive motor 52 to stop, and the drive motor 52 will not be engaged again until the labeling apparatus completes another labeling operation.

Drive mechanism 50 maintains the label web A in tension during the labeling operation. This ensures that throughout the labeling operation not only is a transfer label properly positioned in the release position beneath heating plate 40, but also that the web is held tightly adjacent to the lower surface of the plate. The web may be placed in tension, for example, by a braking mechanism engaged with the supply roll 28 or the measuring roller 32. The brake, for example, may be a drag brake which is constantly applied to the web.

Referring now to FIGS. 1 and 2, the article support, generally designated 16, includes a piston and cylinder assembly 70 having piston rod 72, and an article carrier 74 mounted on one end of the rod. The article carrier 74 includes four flexible arm and roller assemblies 76 (two are shown in FIG. 1 and a third is shown in FIG. 2), which suspend the article C, such as a cylindrical plastic bottle, in such a manner that the bottle is free to rotate about its longitudinal axis. The bottle is engaged at its bottom end by cup 78, which is rotatably mounted on article carrier 74 by spindle 80 and a bearing unit 84 on a standard 82. The article is engaged at its mouth by a nozzle 86, which is rotatably supported by bearing unit 88 on a hollow shaft 90, which is slidably mounted in standard 94 and spring biased in the direction of the longitudinal axis of the bottle.

Air is pumped into the plastic bottle through the shaft 90 and the nozzle 86. This ensures that during the labeling operation the cylindrical wall of the bottle maintains its molded diameter when it is brought into tangential rolling contact with label web A under limited pressure at labeling station 26, as will be explained below.

The piston and cylinder assembly 70 serves as a double-acting pneumatic motor, and in this way, the article carrier 74 and article C are reciprocated in a vertical direction, indicated by arrow 96, which is orthogonal to the direction of motion of labeling carriage 14. Article support 16 raises the bottle C from an initial position well below the plane defined by the lower surface of heating plate 40 to a position such that the curved surface D of the bottle C is in tangential rolling contact with label web A at labeling station 26 as labelling carriage 14 translates horizontally with the web. Bottles and other articles to be labeled may be loaded onto and off of article carrier 74 either manually or automatically.

The label applying apparatus 10 applies a heat transfer label B from label web A to the curved surface D of the bottle C according to a machine sequence controller as follows. With labeling carriage 14 at the start of its rightward stroke, such that righthand edge 98 of heating plate 40 is at positon 98*a* (shown in phantom in FIG. 1), and with label web A properly indexed under the heating plate 40, the controller signals piston and cylinder assembly 20 to begin translating the labeling carriage 14 to the right until the lefthand edge 99 of heating plate 40 reaches position 99*a* (shown in phantom in FIG. 1). At the same time, the controller signals piston and cylinder assembly 70 to raise article carrier 74 and the bottle C from a lowered position (shown in phantom in FIG. 1) below the heating plate 40 to the illustrated elevated position at the transfer station, such that the curved surface D of the bottle C is meets with and is pressed against the lower surface of label web A which bears the transfer label B, while the web uses the heating plate 40 as a bearing surface. The frictional contact made between curved surface D of the bottle C, the plate 40, and label web A as labeling web 14 translates past the transfer station 26, causes the bottle C to rotate freely about its longitudinal axis. While label web A and the bottle C are pressed against the lower surface of heating plate 40, the heating plate causes a label to be released from the web and to bond to the cooler surface D of bottle C.

After labeling carriage 14 completes its rightward stroke, such that lefthand edge 99 of heating plate 40 is at position 99*a* (shown in phantom in FIG. 1), a limit switch signals drive mechanism 50 to index the web in the manner described above. At the same time, the limit switch signals piston and cylinder assembly 20 to begin translating labeling carriage 14 leftward back through the transfer station 26, such that the righthand edge 98 of heating plate 40 is again at position 98*a* (shown in phantom in FIG. 1), and simultaneously the limit switch signals piston and cylinder assembly 70 to lower the article carrier 74 and the bottle C, so that the now labeled curved surface D of the bottle C does not make any further contact the lower surface of heating plate 40 or the label web A.

It is to be understood that various details of design and construction may be modified without departing from the spirit and scope of the invention. For example, the cam detent and detent pickup could be replaced by an optical label sensor; the drive mechanisms for reciprocating the labeling carriage and raising and lowering the article support could be controlled by a timer or limit switches; the heating plate can be controlled by a temperature regulator 100; and the label web could be advanced by a solenoid instead of the drive motor described above. Accordingly, the present invention has been described in a preferred embodiment by way of illustration rather than limitation.

I claim:

1. Apparatus for applying to the curved peripheral surface of an article a transfer label from a series of labels on a web, comprising:

an article support positioning the article at a label transfer station within the apparatus with the curved peripheral surface of the article exposed;

a labeling carriage mounted for reciprocating movement back and forth relative to the transfer station, the carriage including web feed means defining a feed path along which the web of transfer labels extends between supply and take up points at opposite ends of the path;

first drive means for moving the labeling carriage relative to the transfer station with a portion of the web of transfer labels extending along the feed path in tangential rolling contact with the curved peripheral surface of the article while said web remains stationary along said feed path relative to the labeling carriage, release means mounted on the labeling carriage adjacent the web feed path and the portion of the web in rolling contact with the curved peripheral surface of the article for releasing one transfer label in the series from the web onto the curved peripheral surface;

second drive means for moving the web of transfer labels and the curved surface of the article on the support into and out of contact with each other at the transfer station; and third drive means independent of said first drive means of indexing the web of transfer labels along the feed path by a predetermined amount to position another transfer label in the series adjacent the release means while said portion of the web is not in tangential rolling contact with the curved peripheral surface of said article, and for holding said web stationary relative to the labeling carriage while said portion of said web is in tangential rolling contact with the curved peripheral surface of said article.

2. Apparatus for applying a transfer label as defined in claim 1 wherein the labeling carriage is mounted for reciprocating movement back and forth in one direction relative to the transfer station by the first drive means, and;

the article support and the labeling carriage are mounted in the apparatus for movement relative to one another in a second directon orthogonal to said one direction by the second drive means.

3. Apparatus as defined in claim 2 wherein the labeling carriage is restrained against movement in the second direction, and the article support is mounted for movement in the second direction relative to the labeling carriage and the transfer station by the second drive means.

4. Apparatus for applying transfer labels as defined in claim 1 wherein the labels in series on the web are heat releasable, and the release means comprise a heating plate.

5. Apparatus as defined in claim 4 above wherein the heating plate is disposed along the feed path where the portion of the web of transfer labels is brought into tangential rolling contact with the peripheral surface of the article, and the plate defines a flat heating surface against which the web and label are pressed while in contact with the surface of the article.

6. Apparatus for applying a transfer label from a series of labels on the web as defined in claim 1 wherein a measuring roller is mounted on the labeling carriage along the feed path for the web; and detent means are connected for rotation with the measuring roller as the web of transfer labels is indexed relative to the release means by the third drive means, and the detent means is connected in controlling relationship with the third drive means.

7. Apparatus for applying transfer labels as defined in claim 1 wherein the article support comprises a rotatable bottle support and includes means for pressurizing the interior of a bottle during labeling.

* * * * *